United States Patent [19]
Feeley et al.

[11] Patent Number: 5,968,861
[45] Date of Patent: Oct. 19, 1999

[54] TRIMETALLIC ZEOLITE CATALYST AND METHOD OF $NO_x$ ABATEMENT USING THE SAME

[75] Inventors: Jennifer S. Feeley, Clinton; Michel Deeba, North Brunswick; Robert J. Farrauto, Westfield; Dinh Dang, South Plainfield, all of N.J.

[73] Assignee: Engelhard Corporation, Iselin, N.J.

[21] Appl. No.: 09/022,724

[22] Filed: Feb. 12, 1998

Related U.S. Application Data

[62] Division of application No. 08/699,676, Aug. 15, 1996, Pat. No. 5,776,423, which is a continuation of application No. 08/241,072, May 10, 1994, abandoned.

[51] Int. Cl.[6] .................................................. B01J 29/072
[52] U.S. Cl. .................................. 502/74; 502/66; 502/77
[58] Field of Search .................................. 502/64, 66, 71, 502/74, 77, 78, 79; 423/239.2, 213.5

[56] References Cited

U.S. PATENT DOCUMENTS

| | | | |
|---|---|---|---|
| 5,041,272 | 8/1991 | Tamura et al. | 423/239.2 |
| 5,041,274 | 8/1991 | Kagi, Sr. | 423/242 |
| 5,223,236 | 6/1993 | Inoue et al. | 423/213.2 |

FOREIGN PATENT DOCUMENTS

| | | | |
|---|---|---|---|
| 40 16 688 A1 | 6/1991 | Germany | B01D 53/36 |

OTHER PUBLICATIONS

Influence of Cocations on Catalytic Activity of Copper Ion–Exchanged ZSM–5 Zeolite for Reduction of Nitric Oxide with Ethene in the Presence of Oxygen, Catalysis Letters 12(1992) p. 361–366, accptd. 10/23/91, J.C. Baltzer A.B. Scientific Pub. Co., Teraoka et al.

Enhancement of Catalytic Activity of Copper Ion–Exchanged Y Type Zeolites for the Decomposition of Nitrogen Monoxide, Feb. 1989 The Chemical Society Japan, Bull. Chem. Soc. Jpn., 62, p. 583–584, vol. 62, No. 2, Iwamoto, et al.

Cocation Effect in Catalytic Property of Copper Ion–Exchanged ZSM–5 Zeolites for the Direct Decomposition of Nitrogen Monoxide, 1991 The Chemical Society of Japan, Chemistry Letters, p. 407–410, Kagawa, et al.

*Primary Examiner*—Thomas G. Dunn

[57] ABSTRACT

A catalytic material useful for the abatement of $NO_x$ in a lean environment containing a zeolite material having incorporated therein copper, cobalt and iron as catalytically active species. The catalytically active metals are preferably incorporated into the zeolite by ion exchange and precipitation. The catalytic material may typically contain from about 2.0 to about 8.0 percent copper, from about 1.0 to about 4.0 percent iron and from about 0.25 to about 4.0 percent cobalt by weight of the catalytic material, i.e., by weight of the zeolite material plus the catalytic metals incorporated therein. Optionally, the catalytic material may be admixed with a binder and applied as an adherent coating onto a carrier to be placed in a gas stream containing the nitrogen oxides.

2 Claims, 3 Drawing Sheets

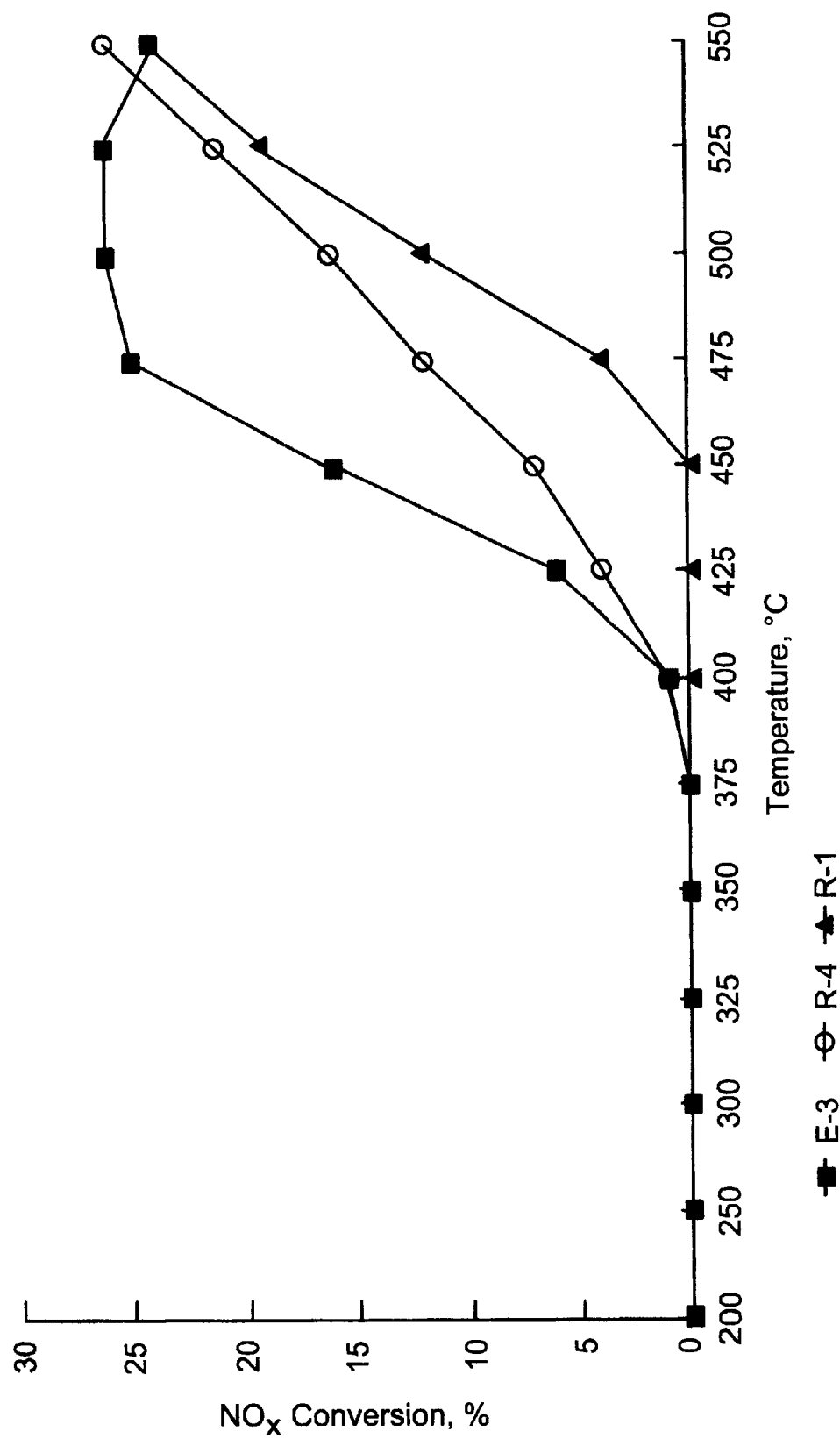

_5,968,861_

TRIMETALLIC ZEOLITE CATALYST AND METHOD OF $NO_x$ ABATEMENT USING THE SAME

This application is a "divisional of application Ser. No. 08/699,676 filed Aug. 15, 1996, now U.S. Pat. No. 5,776,423, which is a File Wrapper Continuation of Ser. No. 08/241,072 filed May 10, 1994, now abandoned.

BACKGROUND OF THE INVENTION

1. Field of the Invention

This invention relates to a catalyst for reducing nitrogen oxides, and more particularly to reducing nitrogen oxides in oxygen-rich exhaust streams, such as the exhaust of lean-operating engines.

In the operation of internal combustion engines, an inherent fuel economy is achieved through the use of lean air/fuel mixtures. However, the lean operation of internal combustion gasoline engines and the normal operation of diesel engines results in the generation of significant quantities of nitrogen oxides, generally signified as $NO_x$, which have been recognized as environmental pollutants. Efforts towards the abatement of the release of $NO_x$ into the atmosphere include the treatment of $NO_x$-containing exhaust gases by exposure to catalysts effective to convert $NO_x$ to less noxious species, e.g., nitrogen and oxygen. While some catalysts, commonly known as "three-way" catalysts, are capable of converting $NO_x$ to nitrogen and oxygen while simultaneously oxidizing any unburned hydrocarbons or carbon monoxide in the waste gas stream, such catalysts are only effective for the reduction of $NO_x$ with exhaust gases produced with near-stoichiometric air/fuel mixtures. Accordingly, if the engine is run under lean conditions to take advantage of the fuel economies mentioned above, a three-way catalyst would not be suitable to convert $NO_x$ in the waste gas. Furthermore, three-way catalysts are not effective for $NO_x$ abatement in connection with diesel exhaust, since diesel engines operate almost entirely under lean conditions.

A catalytic material known to be effective for the abatement of $NO_x$ produced under lean conditions comprises a zeolite material that has been ion-exchanged with copper. However, such zeolite catalysts typically exhibit inadequate catalytic activity at normal exhaust gas temperatures and are of limited durability in such service. Accordingly, there is a need for a $NO_x$ abatement catalyst that operates at a lower temperature and that exhibits greater durability than catalysts of the prior art.

SUMMARY OF THE INVENTION

The present invention relates to a catalytic material effective for the reduction of nitrogen oxides in exhaust gases produced under lean conditions. The material comprises a zeolite material having dispersed therein catalytically effective amounts of copper, iron and cobalt.

According to one aspect of the invention, the zeolite material may be selected from the group consisting of Y-zeolite; Beta zeolite; ZSM-5, mordenite, ferrierite and mixtures thereof. For example, the zeolite material may be selected from the group consisting of ZSM-5, mordenite and ferrierite, in proton or cation form. In one embodiment, the zeolite material may comprise ZSM-5.

According to another aspect of the invention, the copper may comprise from about 2.0 to about 8.0 percent by weight; the iron may comprise from about 1.0 to about 4.0 percent by weight; and the cobalt may comprise from about 0.25 to about 4.0 percent by weight of the catalytic material. For example, the copper may comprise from about 2.5 to about 5.5 percent by weight; the iron may comprise from about 1.5 to about 3.5 percent by weight; and the cobalt may comprise from about 0.25 to about 2.0 percent by weight of the catalytic material.

The invention also relates to a method for reducing nitrogen oxides in a lean waste gas stream comprising flowing the gas stream in contact with a catalytic material as described above.

BRIEF DESCRIPTION OF THE DRAWINGS

FIG. 3 is a plot similar to FIG. 2, showing the $NO_x$ conversion performance of an aged catalyst material in accordance with the present invention and two comparative aged materials, as described in Example 3.

DETAILED DESCRIPTION OF THE INVENTION AND PREFERRED EMBODIMENTS THEREOF

Figure 1:
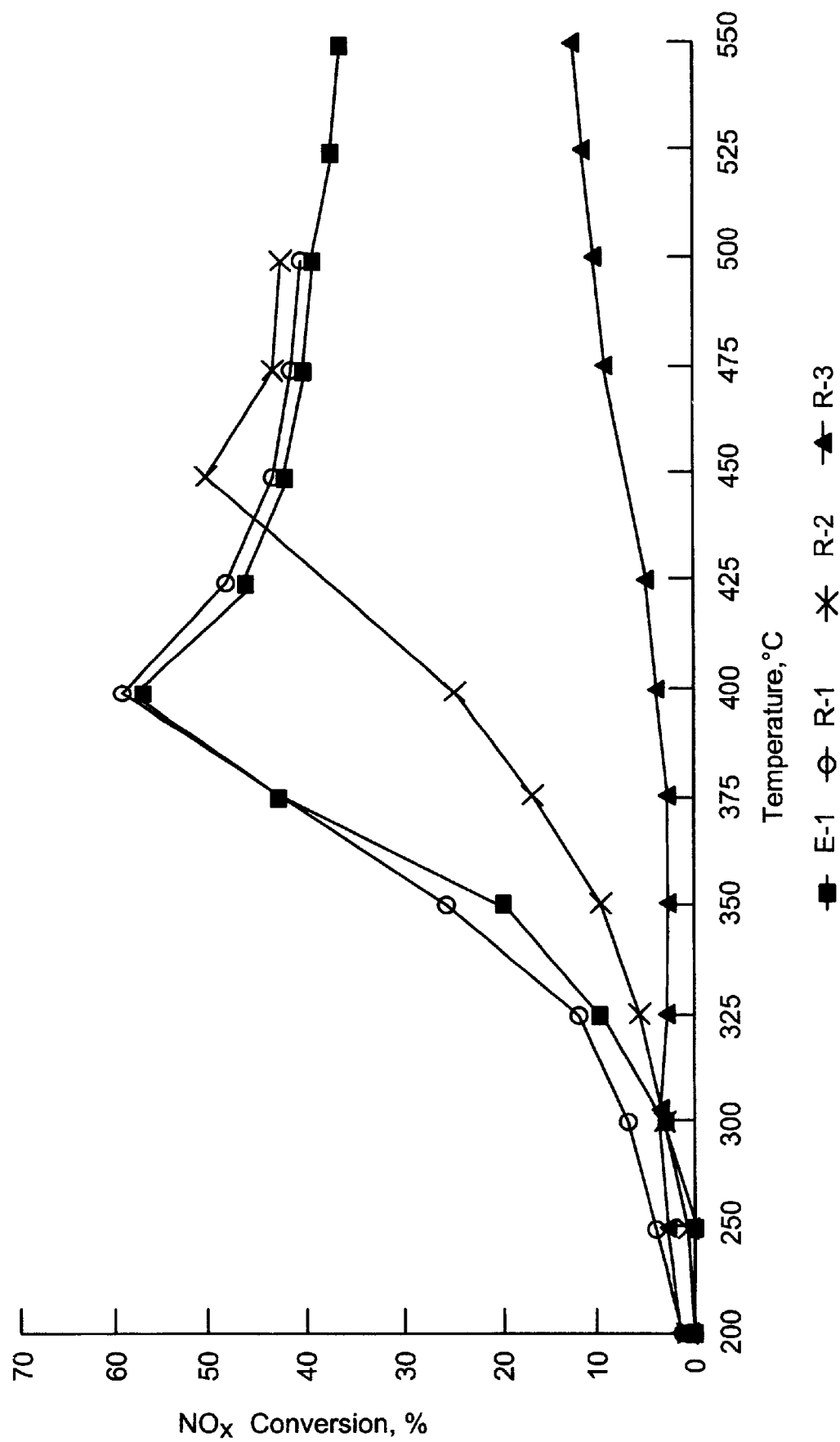
FIG. 1 is a plot showing percent $NO_x$ conversion on the ordinate and temperature on the abscissa, illustrating the conversion activity for a fresh catalytic material in accordance with the present invention and three fresh comparative materials, as described in Example 1.

The present invention relates to copper-containing zeolite catalytic material that has been modified by the incorporation therein of iron and cobalt. The resulting catalytic material is useful in the reduction of $NO_x$ in exhaust gas streams.

Zeolite materials comprising iron and cobalt are known in the art and have been studied with respect to their ability to convert nitrogen oxides to innocuous substances, e.g., $N_2$ and $O_2$. However, in the studies that report activity of these materials, the test conditions are limited so that the space velocities of the nitrogen oxides-containing gases passed over the catalyst materials are low. When these materials are subjected to higher space velocity gas flow, their $NO_x$ conversion performance is unacceptably low or negligible, particularly in comparison with copper-containing zeolite materials. Accordingly, the prior art provided no motivation for combining copper, cobalt and iron in a zeolite material as taught by the present invention. The applicants have found, however, the combination of these three metals tends to lower the temperature at which a copper-containing catalytic material reaches its optimum $NO_x$ conversion rate, particularly after aging, and also lends durability to the catalytic material so that $NO_x$ conversion rates after an accelerated aging cycle are higher than those of comparative materials.

When using materials of the present invention for the reduction of nitrogen oxides, it is important that the exhaust stream contain sufficient hydrocarbons to drive the reduction reaction. The hydrocarbons may be present due to incomplete combustion of the fuel or due to injection into the exhaust stream. Preferably, there is a $C:NO_x$ atomic ratio of at least 0.5:1 in the exhaust stream.

Preferably, the copper, iron and cobalt are incorporated into the zeolite material both by ion exchange and precipitation. This may be accomplished in a conventional manner, i.e., by the immersion of the zeolite material into a solution containing soluble salts of the catalytically active metal species. The pH of the solution may be adjusted, e.g., by the addition of ammonium hydroxide, to induce precipitation of the catalytically active metal cations onto the zeolite material as well. Thus, for example, ZSM-5 zeolite may be immersed in a solution containing copper nitrate, cobalt acetate and iron nitrate for a time sufficient to allow the incorporation of the catalytically active metal cations into the zeolite material by ion exchange, and then ammonium hydroxide may be added to incorporate unexchanged copper, cobalt and iron ions in the solution onto the zeolite material by precipitation. The zeolite material may then be washed, dried and calcined. The resulting catalytic material may comprise from about 2.0 to about 8.0 percent by weight copper, from about 0.25 to about 4.0 percent by weight cobalt, and from about 1.0 to about 4.0 percent by weight iron.

The amount of catalytic metal species incorporated into the zeolite material may be affected by the pH of the solution in which the zeolite material is immersed. For example, two materials according to the present invention were prepared using solutions containing like quantities of the catalytically active metal cations. One solution was adjusted to pH 7 and the second solution was adjusted to pH 8, by the addition of appropriate quantities of ammonium hydroxide. The copper and iron content of the resulting materials were about the same, in the range of 3.0 to 3.5 percent by weight copper and in the range of 1.8 to 2.2 percent by weight iron. However, the material prepared in a pH 7 solution contained cobalt in the range of 0.5 to 1.5 percent by weight; whereas the material prepared in the pH 8 solution contained cobalt in the range of 3.0 to 3.3 percent by weight.

Any suitable zeolite material may be used in accordance with the present invention. For example, zeolites such as Beta zeolite, Y-zeolite, ZSM-5, mordenite and ferrierite, in both acid or proton form and in cation form, are all believed to be suitable for the preparation of catalytic material in accordance with the present invention. Preferably, the zeolite material is a high-silica zeolite having a silica/alumina ratio of at least about 15. For example, the silica/alumina ratio may be in the range of about 15 to about 80, or from about 25 to about 60.

Generally, ion exchange of the catalytic metal species cations into the zeolite material may be carried out at room temperature, or at a temperature up to 80° C., over a period of one to twenty-four hours, at a pH of about 7. The resulting material may be dried at about 100–120° C. overnight, and calcined at about 550° C.

Catalysts according to the present invention are particularly useful for the abatement of $NO_x$ in exhaust gas streams of engines running under "lean conditions", e.g., diesel engines, or gasoline engines operating at an air/fuel ratio corresponding to a $\lambda$ greater than 1.0; preferably to a $\lambda$ equal to or greater than 1.1, where $\lambda=1$ indicates an air/fuel mixture containing a stoichiometric balance of fuel and oxygen for the complete combustion of the fuel.

As used herein and in the claims, the term "catalytic material" refers to a refractory inorganic oxide support material, e.g., the zeolite materials described above, having the catalytically active metal species incorporated therein. The catalytic materials in accordance with the present invention may be used on their own, e.g., in powder or pelletized form, and the exhaust gas may be passed therethrough. Alternatively, the catalytic material may be disposed on a suitable carrier, e.g., a honeycomb monolith as described in the following examples. Optionally, the catalytic material may be combined with a relatively inert binder material that may be useful in helping the catalytic material to adhere to the carrier.

EXAMPLE 1

Preparation

A reference catalyst material was prepared by dissolving 17 g $Cu(NO_3)_2.3H_2O$ and 18.92 g $Fe(NO_3)_3.9H_2O$ in 2 liters deionized water. To this solution, 120 g of H-ZSM-5 was added with stirring. Stirring continued for 1 hour at 60° C., and then the pH of the slurry was adjusted to 8.0 by the addition of a dilute solution of $NH_4OH$. Stirring was continued at pH 8 for 4 hours at 60° C. The resulting material was then filtered, washed with 2 liters deionized water and dried at 120° C. for 2 hours. Calcination was carried out by raising the temperature from 25° C. to 550° C. over a 4 hour period, and holding the temperature at 550° C. for 2 hours. The resulting catalytic material was incorporated into a washcoat slurry that also contained about 5 percent by weight of the Nalco™ 1056 binder and about 60 percent water. The binder comprised 4 weight percent alumina coated on 26 weight percent silica sol, providing 30 percent solids in a water-based sol. A cylindrical cordierite honeycomb carrier measuring 3 inches in length with a diameter of 1.5 inches and having 400 cpsi was immersed in the washcoat slurry to coat the honeycomb. After drying and calcining, the carrier had a washcoat loading of 2.0 g/in$^3$. All honeycomb carriers used in this and the following examples had like configurations, and for the sake of brevity, are referred to herein as "standard" honeycomb carriers. The coated carrier was calcined from 25° C. to 550° C. over 4 hours and then at 550° C. for 2 hours. The finished reference catalyst member was designated R-1.

Reference catalyst members R-2 and R-3 were prepared in the same manner as R-1, except that the 17.48 g $Co(C_2H_3O_2)_2.4H_2O$ were added to the solution in place of the iron compound to prepare R-2 and in place of the copper compound to prepare R-3. The catalytic material on R-1 comprised 3.22% Cu by weight and 1.96% Fe by weight. The catalytic material on R-2 comprised 3.17% Cu by weight and 3.13% Co by weight. The catalytic material on R-3 comprised 3.3% Co by weight and 1.98% Fe by weight.

Experimental Catalyst

An experimental catalyst member was prepared by dissolving 900 g $Co(C_2H_3O_2)_3.4H_2O$, 972 g $Fe(NO_3)_3.9H_2O$ and 871 g $Cu(NO_3)_3.3H_2O$ in 26 liters of water. A quantity of 6164 g ZSM-5 zeolite was added to the solution with stirring for one hour at room temperature, resulting in a pH of 4.5. An ammonium hydroxide solution was added to adjust the pH of the solution to pH 7 and stirring was continued for one hour. The resulting catalytic material was washed with 26 liters of water, and was dried. The catalytic material was formed into a washcoat slurry by combining it with 5 percent Nalco™ 1056 binder and was coated onto a standard honeycomb carrier and dried at 110° C. for 2 hours, to provide a washcoat loading of 2 g/in$^2$ (dry basis). The catalyst member was calcined from room temperature to 550° C. over 4 hours and at 550° C. for 2 hours. The catalytic material on the carrier comprised 3.31% Cu, 2.27% Fe and 0.72% Co by weight of the catalytic material. The finished experimental catalyst member was designated E-1.

Test

Experimental catalyst member E-1 and reference catalyst members R-1, R-2 and R-3 were tested by flowing a test gas stream through each and observing the rate of $NO_x$ conversion at various temperatures. The test gas stream comprised 1000 ppm NO, 4000 ppm C (from $C_3H_6$); 50 ppm $SO_2$; 10% $O_2$; 10% $H_2O$; balance nitrogen. The test gas was flowed through the catalyst members at 72 l/min, corresponding to a space velocity of 50,000/hr GHSV. The inlet temperature ranged between 200° C. and 600° C. The maximum $NO_x$ conversion rate and the temperature at which the maximum rate was attained for catalyst member E-1 was observed. The low activity of R-3 reflects the absence of copper in the catalytic material and the relatively poor catalytic activity of cobalt and iron. It is evident from FIG. 1 that experimental catalyst member E-1 and reference catalyst member R-1 had similar activities that were significantly better at low temperatures than those of R-2 and R-3. As illustrated in Example 2, however, E-1 is expected to be more durable than R-1, and is therefore surprisingly superior to all the reference catalyst members in this example.

EXAMPLE 2

Experimental Catalyst

Figure 2:
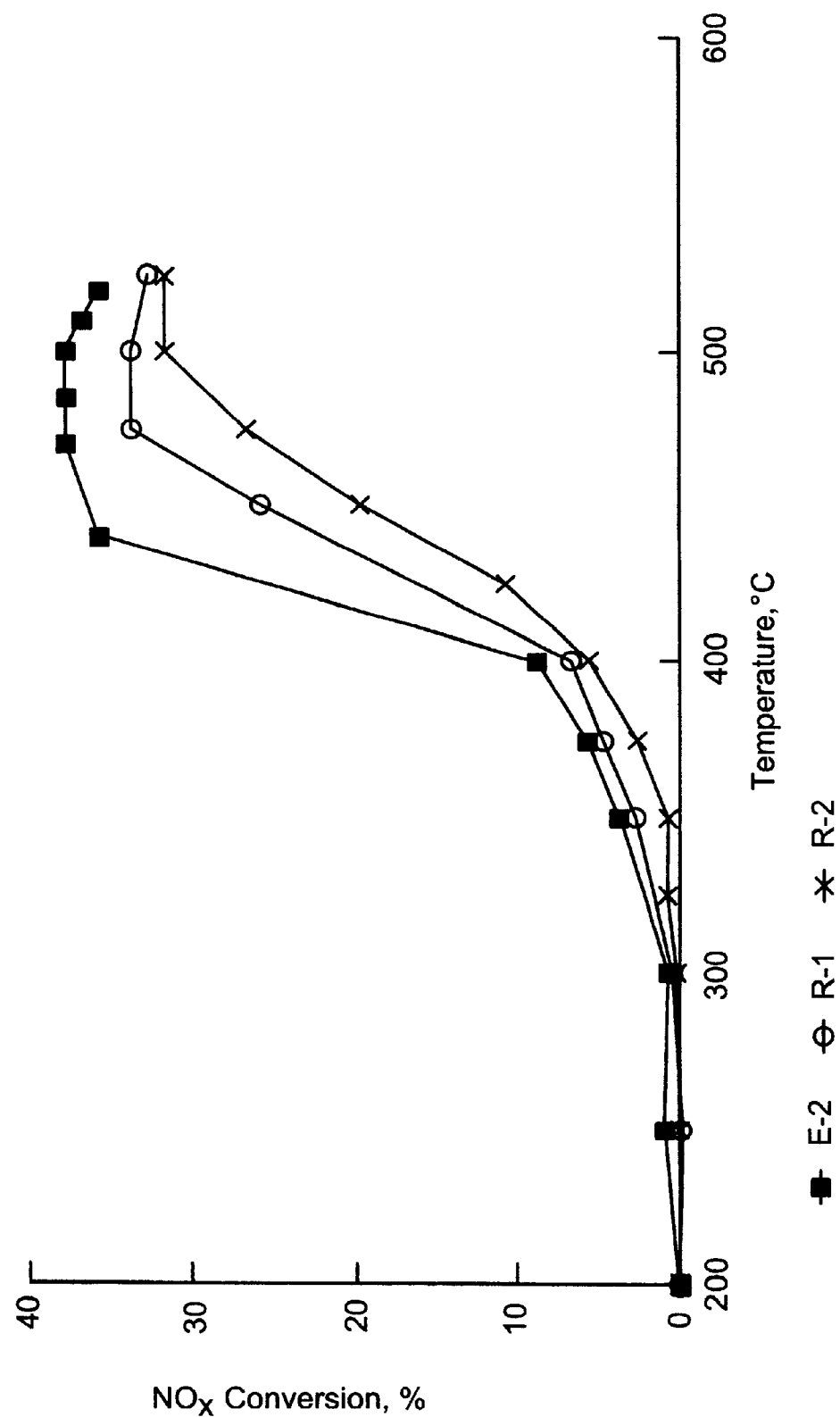
FIG. 2 is a plot showing percent $NO_x$ conversion on the ordinate and temperature on the abscissa, and illustrating the conversion performance of an aged catalyst material in accordance with the present invention and two comparative aged materials, as described in Example 2.

An experimental catalyst member designated E-2 was prepared as generally described above in Example 1, to comprise a catalytic material comprising 3.46% Cu, 1.35% Co and 2.03% Fe by weight of the catalytic material. Catalyst members E-2 and R-1, R-2 and R-3 of Example 1 were aged by exposure to a mixture of 10 percent steam in air for 5 hours at 700° C. After aging, the $NO_x$ reduction activities of E-2, R-1, R-2 and R-3 were tested as described above in Example 1. The results are represented in FIG. 2. It is evident from FIG. 2 that catalyst member E-2, which comprised a catalytic material in accordance with the present invention, exhibited superior durability to reference catalysts R-1 and R-2. Catalyst member R-3 had such a low activity that conversion data were not collected after aging.

EXAMPLE 3

Experimental Catalyst

An experimental catalyst was prepared as generally described above in Example 1 to produce a catatylic member having a catalytic material thereon comprising 3.1% Cu, 0.95% Co and 2.2% Fe by weight of the zeolite catalytic material. The finished catalyst member was designated E-3.

Reference Catalysts

A reference catalyst member designated R-4 was prepared by dissolving 117 g $Cu(NO_3)_3.3H_2O$ in 4 liters of deionized water. One thousand grams of H-ZSM-5 was added with stirring for 1.5 hours. The pH was then adjusted to a pH of 7 using a dilute ammonium hydroxide solution, and the slurry was stirred for an additional hour. The resulting catalytic material, which comprised 3.11% Cu by weight of copper plus zeolite, was filtered, washed with deionized water and dried. The dry catalytic material was made into a washcoat slurry by mixture with 5% Nalco™ 1056 binder and about 60% water. The washcoat slurry was coated onto a standard honeycomb carrier to yield a washcoat loading of 2.0 g/in² (dry basis) and was calcined from 25° C. to 550° C. over 4 hours and then at 550° C. for 2 hours. The resulting reference catalyst member was designated R-4.

Experimental catalyst member E-3 and reference catalyst member R-4 were aged by exposure to 10% steam in air at 700° C. for a period of 5 hours. The $NO_x$ conversion activity of the aged catalyst members E-3, R-4 and the aged catalyst member R-1 of Example 2 were tested in a gas stream at 100,000/hr GHSV using a total gas flow of 144 l/min. The results are set forth in FIG. 3.

The data shown in FIG. 3 show that the trimetallic catalyst material in accordance with the present invention showed greater activity after aging than either of the reference catalyst members. Thus, the enhanced durability of the catalytic materials in accordance with the present invention is clearly demonstrated.

While the invention has been described in detail with respect to specific preferred embodiments thereof, it is to be understood that upon a reading of the foregoing description, variations to the specific embodiments disclosed may occur to those skilled in the art and it is intended to include such variations within the scope of the appended claims.

What is claimed is:

1. A catalytic material effective for the reduction of nitrogen oxides in exhaust gases produced under lean conditions, the catalytic material comprising a zeolite material comprising ZSM-5, the zeolite material having dispersed therein from about 2.0 to about 8.0 percent by weight of copper, from about 1.0 to about 4.0 percent by weight of iron and from about 0.25 to about 4.0 percent by weight of cobalt.

2. The catalytic material of claim 1 wherein the copper comprises from about 2.5 to about 5.5 percent by weight; the iron comprises from about 1.5 to about 3.5 percent by weight; and the cobalt comprises from about 0.25 to about 2.0 percent by weight of the catalytic material.

* * * * *